2,901,347

NICKEL-CHROMIUM-GERMANIUM ALLOYS FOR STAINLESS STEEL BRAZING

James A. McGurty and Earl S. Funston, Oak Ridge, Tenn., assignors to the United States of America as represented by the United States Atomic Energy Commission No Drawing. Application May 11, 1954
Serial No. 429,139

2 Claims. (Cl. 75—171)

This invention relates to new alloys and, in particular, to new alloys which are especially useful for joining elements of stainless steel by brazing especially where the brazed elements are to be used in high temperature applications.

Brazing alloys known to the art have been found to be deficient in numerous essential characteristics when attempts were made to use them to join stainless steel elements which were to be subjected to high temperatures. Thus the known alloys may exhibit poor flow characteristics thereby making complete bonding difficult. The tendency of such alloys to infuse the stainless steel at the temperatures involved creates additional problems in that extremely brittle alloys are formed at the joint as a result of the brazing operation thereby creating a hazard to the material and personnel involved. Low oxidation resistance at high temperatures and low remelt temperatures are further considerations militating against the use of known grazing alloys in work of this nature.

Accordingly, it is an object of this invention to produce new alloys.

Another object of this invention is to produce alloys which are especially useful for the brazing of stainless steel elements.

A further object is to produce alloys characterized by high remelt temperature, excellent flow characteristics, and being highly oxidation resistant at high temperatures. Other objects will appear hereinafter.

These objects are accomplished by the invention described hereinafter. This invention pertains to alloys containing nickel, chromium, and germanium.

Compositions of alloys within the scope of this invention range with the limits of 37–65% Ni, 5–40% Cr and 15–40% Ge (in weight percent). Considering the invention from the germanium content of the new alloys, the invention encompasses alloys containing from 15–40% germanium. As the germanium content approaches 40%, the melting point of the alloy is somewhat higher than that of the alloy composed of the optimum composition. As the germanium content decreases appreciably below 30%, the melting point of these alloys also increases; however, in this latter instance, the increased toughness and decreased costs resulting may make such an alloy especially useful for a unique brazing application thereby offsetting such inconvenience as may result from the increased melting point.

Non-limiting specific examples of the alloys of this invention are set forth in the following table:

Table I

[Compositions in weight percent]

| Alloy No. | Percent Ni | Percent Cr | Percent Ge |
|---|---|---|---|
| 1 | 64 | 21 | 15 |
| 2 | 61 | 23 | 16 |
| 3 | 58 | 25 | 17 |
| 4 | 54 | 27 | 19 |
| 5 | 50 | 30 | 20 |
| 6 | 40 | 40 | 20 |
| 7 | 44 | 33 | 23 |
| 8 | 37 | 37 | 26 |
| 9 | 61 | 13 | 26 |
| 10 | 64 | 8 | 28 |
| 11 | 57 | 13 | 30 |
| 12 | 65 | 5 | 30 |

The melting points of the above alloys range from 1900–2200° F.

In order to facilitate production brazing using any brazing alloy, the alloy must have favorable flow characteristics. The flow characteristics may be demonstrated by the T joint test. For this test, two flat sheets of stainless steel are mechanically held together, one sheet being normal to the center surface of the other so that the cross section appears as an inverted T. The common contact is the interface to be joined and is approximately three inches long. A small quantity of braze is applied to one end of the joint and on firing must run the entire length of the joint without excessive solution of the stainless steel. Tests of the alloys set forth in Table I show that the alloys of this invention have flow characteristics which are fair to excellent in all instances.

The preferred alloys of this invention are those having a germanium content of from 20 to about 30% and the specific alloy considered to be optimum for the objects of this invention have a composition of 57% Ni, 13% Cr and 30% Ge. Characteristics of the optimum alloy appear in the following table:

Table II

| Property | Alloy No. 11 (Table I above). |
|---|---|
| Composition (weight percent) | 57% Ni—13% Cr—30% Ge. |
| Composition (atomic percent) | 59.5% N.—15.3% Cr—25.2% Ge. |
| Oxidation resistance | Greater than 310 Stainless Steel. |
| Hardness | R/C 42. |
| Melting point | 1950° F. ±5° F. |
| Brazing temperature | 2150° F. |
| Remelt temperature | Greater than 2300° F. |
| Tensile strength, 70° F. | 60,000 p.s.i.[1] |
| Reduction in area, 70° F. | 5–10%.[1] |

[1] Mechanical properties based on traverse rupture test data.

The alloys of this invention may be made in any manner known to the art for alloys melting at temperatures of about 1900–2200° F. For example, the components of the alloy may be melted in an induction furnace under an argon cover and cast in ingot form in air. The preferred form for using this alloy to braze stainless steel elements is a powder of −200 mesh and is may be produced as follows: the ingot produced in the furnace may be turned on a lathe with a carbide tool without burning to produce chips. The chips are then reduced to powder of less than 200 mesh by ball milling for about 1–2 hours.

The following is a specific example of filler wire brazing using the optimum alloy of this invention. An edge composed of adjoining pieces of stainless steel which is to be sealed is prepared by spot welding a stainless steel wire to the edge, using sufficient spots to hold the wire in position. The brazing alloy powder is then applied and the joint is brazed in a dry hydrogen atmosphere at 2100° F. The effectiveness of the seal may be shown by heating the specimen in static air for 100 hours at 1900° F. and examining the seal for infusion of the alloy into the steel.

As can be seen from the foregoing material, the new alloys constituting this invention are eminently suited to effect the objects thereof. The alloys of this invention are highly useful for the brazing of stainless steel especially where the brazed article is subjected to relatively high temperatures in use. The present invention is not to be limited to any particular method of making the new alloys, but is limited only by the following claims in which it is desired to claim all novelty inherent in the invention.

What is claimed is:

1. A new ternary brazing alloy consisting of from 37 to 65 weight percent of nickel, from 5 to 40 weight percent of chromium, and from 15 to 40 weight percent of germanium.

2. A new ternary brazing alloy consisting of 57 weight percent of nickel, 13 weight percent of chromium, and 30 weight percent of germanium.

References Cited in the file of this patent
UNITED STATES PATENTS 2,514,879     Lark-Horovitz et al. _____ July 11, 1950

OTHER REFERENCES

"Z. Metallkunde," 32, 52–61 (1940).